United States Patent Office 3,030,260
Patented Apr. 17, 1962

3,030,260
THERMOPLASTIC ADHESIVE SEALANTS
Edward C. Metzler, Jr., Woodland Hills, and Hampton M. Clancy, Inglewood, Calif., assignors to North American Aviation, Inc.
No Drawing. Filed Dec. 15, 1958, Ser. No. 780,197
11 Claims. (Cl. 156—305)

This invention is concerned with a thermoplastic sealant composition which effectively wets all metal surfaces, possesses a high degree of adhereability to such surfaces over a wide temperature range and retains its flexibility at extremely low temperatures as well as after exposure to high temperatures. In its more specific aspects, it pertains to a composition comprised of a copolymer of a halogenated ethylene and a partially halogenated ethylene in combination with a homopolymer of a perfluoro olefin, and to the utilization of this composition as a high temperature groove sealant and as a low temperature faying surface adhesive sealant.

Notwithstanding the wide industrial utilization of halogenated thermoplastic polymers in applications making use of their recognized chemical inertness, thermostability, electrical insulating properties and easy formability, neither the polymers themselves, nor any plasticized or otherwise modified polymer compositions have been successfully employed over a broad temperature range as metal adhesives or sealants. Such compositions either fail to function in such applications because of their inability to effectively wet all metal surfaces, or because their brittle temperatures are too high to permit use in low temperature environments, or because they very rapidly lose their flexural strength at low temperatures. Compositions which do maintain sufficient flexibility at low temperatures have been found to be unsatisfactory either because they have insufficient adherence to various metal surfaces or because they require excessively high temperatures for fusion. As an example of the latter deficiency, a polyperfluoroethylene polymer which retained its flexibility at temperatures as low as minus 320° F. required a temperature in the range of 650° F. before the polymer could be adhered to a metal surface. It will be apparent that this polymer could not be used in conjunction with aluminum members in view of the rapid anneal and loss of strength which aluminum undergoes at such temperatures.

For some applications, as where the composition is injected into a groove between the mating surfaces of a compartment or integral fuel tank structure in an aircraft for purposes of providing a fluid tight seal, it is essential that the groove sealant have an injectable consistency at relatively low temperatures in order to insure continuity of sealant in the sealed grooves under production conditions. For this reason, the sealant should possess the necessary plasticity at temperatures under 250° F. On the other hand, where the composition is intended for use in high speed aircraft or missile systems, aerodynamic heating will cause the sealant composition to be subjected to temperatures substantially higher than this. It is, therefore, necessary that the sealant maintain a putty-like consistency at these high temperatures and be resistant to extended aging at temperatures exceeding 450° F. The composition must, of course, effectively provide a fluid seal at temperatures from below zero to the high temperatures referred to above. It must, in addition, possess excellent adhesion to metals and be resistant not only to water but to aromatic aircraft fuels. There are no groove sealants commercially available or known to the art which will satisfactorily comply with all of the foregoing requirements.

The purpose of our invention is, therefore, to provide a thermoplastic adhesive and sealant composition which will effectively wet all metal surfaces and be fusible thereto at temperatures as low as 300° F., which will provide an adherent, high structural strength bond to the metal, which has high flexural strength over a broad range of temperatures and which maintains its flexibility at minus 320° F. It is a further object of our invention to proivde a thermoplastic polymer composition which may be utilized both as a faying surface adhesive and as a high temperature groove or channel sealant. We also desire to provide a thermoplastic composition which is impact insensitive in various explosive environments such as liquid oxygen and hydrogen peroxide systems. Another of the objects of our invention is to provide a thermoplastic halogen containing polymer composition which can be fabricated in the form of a tape of any desired thickness without developing cracks or discontinuities therein. It is also a purpose of our invention to provide a thermoplastic adhesive and sealant composition which has relatively high tensile and adhesive strengths over a broad temperature range and which can, thus, be used in conjunction with other attachment means, or alone, to contribute the required structural strength to an assembly. Yet a further object of our invention is to provide a method for preparing a thermoplastic, impact insensitive, high flexural strength, halogenated polymeric composition.

These as well as further objects will be apparent from a consideration of the following description, inclusive of the accompanying illustrative embodiments.

The requisite properties to the accomplishment of the foregoing adhesive and sealing objectives are possessed by compositions which are formulated by admixing a homopolymer of a perfluoro olefin with a copolymer of a completely halogenated ethylene and a partially halogenated ethylene.

Exemplary of the completely halogenated ethylenes of the copolymer component of our composition are trifluorochloroethylene, 1,1-dichloro 2,2-difluoroethylene, 1,2-dichloro 1,2-difluoroethylene and trichlorofluoroethylene. The partially halogenated ethylene component of the copolymer is illustratively inclusive of vinyl chloride, 1,1-dichloroethylene (vinylidene chloride), 1,1-difluoroethylene (vinylidene fluoride), 1,1-fluorochloroethylene and trifluoroethylene.

Since copolymers formulated of constituents taken from each of the foregoing groups are commercially available from the Minnesota Mining and Manufacturing Company under the trademark "Kel-F" and since our invention is not concerned in any sense with the copolymerization of the above components, a method for preparing the copolymer will not be described except by referring to U.S. Patent Nos. 2,738,343 and 2,770,615, respectively issued to Dittman et al. and Kroncke, both of which describe methods for preparing the copolymer. In any event, although we prefer to employ a copolymer of trichlorofluoroethylene and vinylidene chloride, we have found that a copolymer of any completely halogenated ethylene and any partially halogenated ethylene will function in a complete satisfactory manner.

Insofar as the thermoplastic homopolymer constituent of our composition is concerned, it is preferred to use polytetrafluoroethylene. Nevertheless, any perfluoro olefin such as hexafluoropropylene will be found suitable for use.

In order to achieve the objects of our invention, it will be found necessary to formulate a composition containing from 3 to 35 parts by weight of the thermoplastic homopolymer for every 100 parts by weight of the copolymer. Although such compositions can be alternatively utilized as faying surface adhesives or as groove sealants, it will be preferable to use from 3 to 15 parts by weight of the homopolymer for every 100 parts by weight of the copolymer where the composition is intended for use as a faying surface adhesive. On the other hand, where the composition is destined for utilization as a groove salient, we prefer to formulate a composition containing from 15 to 35 parts by weight of the homopolymer to every 100 parts by weight of the copolymer.

The composition of our invention may be prepared by a conventional rubber mill banding operation, in which event the thermoplastic copolymer comprised of the completely halogenated and partially halogenated ethylenes is applied to mill rollers which have been previously heated to a temperature of from 275° F. to 300° F. After the copolymer has acquired sufficient plasticity for easy banding, the homopolymer is gradually incorporated therein. The mill rolls are subsequently continuously operated for a sufficient period of time to obtain as homogeneous a composition as possible. The material can then be fabricated in the form of a thin film, five or ten mils thick, by rolling or other conventional means.

Although a composition prepared in accordance with the foregoing method will be suitable for use, the difficulty of obtaining adequate mixing indicates the desirability of formulating the composition in accordance with the preferred method described below.

In accordance with this method, a sufficient quantity of the copolymer is dissolved in a hydrocarbon solvent selected from the class consisting of cyclic ethers, ketones and esters to give an approximately 20% solids solution. It is desirable not to exceed by too much the 20% solids limitation specified, since increasing the solids content increases the viscosity of the solution. Thus, a copolymer-hydrocarbon solution containing 30% solids approaches the practical viscosity limit of utility.

The homopolymer constituent of our composition is utilized in the form of an extremely fine dispersion in water. A suitable dispersing agent such as an alkyy aryl polyether alcohol may be added to the water prior to incorporation of the homopolymer in order to obtain an ultimate dispersion containing as great a solids content as possible. By utilizing a dispersing agent, it will be found possible to obtain dispersions containing over 50% of the homopolymer.

The above specified quantities of the homopolymer-water dispersion and the copolymer-hydrocarbon solvent solution are admixed in a settling tank to provide an ultimate composition of the desired constitution. This admixture of the solvent solution and the water dispersion results in the coprecipitation of the copolymer and the homopolymer constituents in the form of a very intimately mixed composition. Although the specific nature of the resulting composition has not been established, it is known that no chemical bond exists between the constituents of the composition. On the other hand, it would seem that a secondary or association bond exists between the homopolymer and the copolymer.

In any event, after coprecipitation has been completed, the solid composition is separated from the liquids in any conventional manner as by decantation or filtration. The solids are then dried by blotting or evaporating the solvent and water, after which the solids are subjected to rubber mill banding in order to obtain orientation of the homopolymer constituent with a consequent increase in the tensile strength of the material. The mill banded composition may then be rolled or otherwise formed into a thin tape. Alternatively, when the composition is to be employed as a groove sealant, it may be maintained in any convenient bulk form prior to heating and thermoplastic injection.

The details and advantages of our invention will become apparent from a consideration of the following illustrative examples.

EXAMPLES 1–19

In order to establish the effectiveness of our composition in performing its intended function, the following comparative tests were performed. We initially formulated our adhesive and sealant compositon by dissolving 100 parts of a copolymer of chlorotrifluoroethylene and vinylidene fluoride in 390 parts of methyl ethyl ketone. A polytetrafluoroethylene water dispersion containing 22 parts of solids and 120 parts of water was added to the copolymer solution with agitation. Simultaneously, the perfluoro polymer coagulated and the copolymer resin precipitated from the solution. The almost clear liquid phase was removed by decantation. Most of the entrained liquid was promptly removed from the solids by pressing them between lint-free absorbent cloth, while residual liquids were removed by drying the composition at 220° F. for approximately 16 hours. The solids were then processed by banding on a rubber mill whose rollers were preheated to a temperature of 275° F. and subsequently a portion of the composition was rolled into a 5 mil thick tape.

The composition of our invention, prepared in accordance with the foregoing method, as well as the materials identified in Table I, were tested for low temperature flexural strength as well as liquid oxygen and hydrogen peroxide impact sensitivity in accordance with the test procedures specified.

A separate flexibility test specimen was made up for each of the compositions tested. This test specimen consisted of a relatively narrow strip of Inconel of .053 inch thickness and a strip of –7075T6 aluminum of the same width and having a thickness of .050 inch. Each of the faying surface adhesives was applied in the form of the five mil thick tape to one surface of the aluminum or Inconel panels, after which the remaining panel was riveted in overlapping relationship with the tape covered portion of the other panel. The film specimen was fused at 300° F. for two hours, after which the flexibility test specimen was immersed in liquid nitrogen, B.P. minus 320° F. Each of the specimens was then flexed twice by applying an off-center tensile load of 1330 pounds and then flexed one hundred times by applying an off-center tensile load of 1200 pounds. The specimens were subsequently tested for their sealing ability by directing a 100 p.s.i. airstream against one side of the seal while examining the other side with a bubble fluid. After removal of the rivets, the bond was ruptured and the panel surfaces examined for mode of failure. The material was considered to have passed the flexibility test if it did not leak and if it failed cohesively when the joint was ruptured. Some of the organic materials as well as the low temperature welding alloy were more conveniently tested for flexural strength and general physical properties by applying them as fillets over the joints formed by the overlapped abutting Inconel and aluminum panels.

Impact sensitivity in a liquid oxygen environment was tested by placing approximately 1 cc. of the material under test in an aluminum foil cup containing 5 cc. of liquid oxygen. The cup was then subjected to a 60 foot-pound impact. If each of ten specimens of a given material showed no evidence of explosion when tested as above, the material was considered to be impact insensitive. A similar procedure was followed to determine impact sensitivity of the specimens in 90% hydrogen peroxide.

In order to test the suitability of the various compositions for use as groove sealants, a pair of test plates were employed. These plates were provided with centrally disposed depressions to form a fuel chamber when the plates were in abutting relationship. The test plates were provided with continuous matching grooves surrounding the fuel chamber and holes were drilled through the plates within the groove area to receive fasteners. Sealant injection holes were also drilled into the groove. In addition, one of the plates was provided with fuel pressurization holes and plugs therefor in order to permit admission of fuel under pressure to the test chamber.

Each of the materials tested was separately injected into the groove formed in the sealing test plate assembly, after which the fuel chamber was filled with a test fluid consisting of 70% isooctane and 30% toluene. The plate assembly was subsequently aged at 120° F. for a period of two days, after which the test fluid was drained from the fuel chamber and the plate assembly heated for a period of one day at a temperature of 455° F. The internal fuel chamber was then pressurized to 45 p.s.i.g. at room temperature in a water bath in order to determine the presence of any leaks past the groove sealant. If no leaks occurred, the plate was subsequently heated to 455° F. in a silicone fluid bath and the internal chamber pressurized to 45 p.s.i.g. If no failure occurred after this test procedure, the foregoing cycle was repeated until failure occurred or until nine cycles had been completed. It was considered that the material would function satisfactorily as a groove sealant if no failure occurred within nine cycles.

Table I summarizes the materials tested, the conditions of the test and the results obtained.

*Table I*

| Composition | Groove Sealant Test | Temperature Stability, 336 Hrs. at 450° F. | Impact Sensitive | | Flexural Resistance Test |
|---|---|---|---|---|---|
| | | | Liquid Oxygen | 90% H₂O₂ | |
| 100 parts Copolymer of chlorotrifluoroethylene and Vinylidene fluoride 18 parts Homopolymer of polytetrafluoroethylene. | passed | stable | No | No | |
| Copolymer of chlorotrifluoroethylene and Vinylidene fluoride. | failed after 1 cycle. | stable but softens. | No | No | failed. |
| 100 parts Copolymer of chlorotrifluoroethylene and Vinylidene fluoride 25 parts Titanium dioxide powder. | ...do... | stable | No | No, but active. | |
| 100 parts Copolymer of chlorotrifluoroethylene and Vinylidenefluoride 5 parts Colloidal silica. | failed after 2 cycles. | ...do... | No | No | |
| 100 parts Colopymer of hexafluoropropylene and Vinylidene fluoride 25 parts Tricresylphosphate. | failed after 1 cycle. | stable but hardens. | Yes | Yes | |
| 100 parts Polytetrafluoroethylene 20 parts High viscosity silicone gum. | ...do... | less flexible. | Yes | No | |
| 100 parts High Viscosity silicone gum 145 parts Titanium dioxide powder. | ...do... | stable | Yes | No | |
| 100 parts Copolymer of chlorotrifluoroethylene and Vinylidene fluoride 57 parts Homopolymer of chlorotrifluoroethylene 15 parts High viscosity silicone gum. | ...do... | ...do... | Yes | No | |
| 100 parts Polyfluoro butyl acrylate 25 parts Copolymer of chlorotrifluoroethylene and Vinylidene fluoride. | ...do... | separated | No | No | failed. |
| 100 parts Polyfluoro butyl acrylate 80 parts Diatomaceous silica powder. | ...do... | excessive expansion. | Yes | No | Do. |
| 100 parts Polyfluoro butyl acrylate 40 parts Carbon black powder. | ...do... | ...do... | Yes | No | Do. |
| 100 parts Poly 2-Chloro-1,3-butadiene 20 parts Polychlorotrifluoroethylene 10 parts Polyester thermoplastic resin. | ...do... | decomposed | Yes | Yes | |
| Fluoro silicone rubber | ...do... | stable | No | No | failed. |
| High viscosity silicone gum | applied as fillet. | | Yes | No | Do. |
| Solder (95% Tin, 5% Silver) | applied as ⅛" dia. fillet. | | No | No | Do. |
| Polyperfluoroethylene | | | No | No | passed, but 650° F. required for application. |
| 50 parts Copolymer of butadeine and acrylonitrile and 100 parts Copolymer of phenol and formaldahyde. | | stable but hard. | Yes | Yes | failed. |
| Epoxy resin | | brittle | Yes | Yes | Do. |
| 100 parts Copolymer of chlorotrifluoroethylene and Vinylidene fluoride 6 parts Homopolymer of polytetrafluoroethylene. | | stable | No | No | passed. |

It will be seen from the foregoing examples that the composition of our invention satisfied all requirements for function as a groove sealant and faying surface adhesive sealant while none of the other materials tested indicated its suitability for such purpose.

It is to be understood that the foregoing description is by way of illustration only and not by way of limitation; the accompanying claims setting forth the limits of our invention.

We claim:

1. A thermoplastic polymeric composition comprising from 3 to 35 parts by weight of tetrafluoro olefin polymer and 100 parts by weight of a copolymer of a completely halogenated ethylene and a partially halogenated ethylene.

2. A thermoplastic polymeric composition comprising from 3 to 15 parts by weight of tetrafluoro olefin and 100 parts by weight of a coplymer of a completely halogenated ethylene and a partially halogenated ethylene.

3. A thermoplastic polymeric composition comprising from 15 to 35 parts by weight of tetrafluoro olefin and 100 parts by weight of a copolymer of a completely halogenated ethylene and a partially halogenated ethylene.

4. A thermoplastic polymeric composition comprising from 3 to 35 parts by weight of polytetrafluoroethylene and 100 parts by weight of a copolymer of chlorotrifluoroethylene and vinylidene fluoride.

5. A thermoplastic polymeric composition comprising from 3 to 15 parts by weight of polytetrafluoroethylene and 100 parts by weight of a copolymer of chlorotrifluoroethylene and vinylidene fluoride.

6. A thermoplastic polymeric composition comprising from 15 to 35 parts by weight of polytetrafluoroethylene and 100 parts by weight of a copolymer of chlorotrifluoroethylene and vinylidene fluoride.

7. A method for compounding a thermoplastic sealant composition which comprises dissolving a copolymer of a partially halogenated ethylene and a completely halogenated ethylene in a hydrocarbon solvent selected from the class consisting of cyclic ethers, ketones and esters to form a copolymer solution having a solids content of less than 30% by weight, incorporating a homopolymer of a tetrafluoro olefin in water containing a dispersing agent to form a tetrafluoro olefin homopolymer dispersion, intermixing said copolymer and said homopolymer dispersion to coprecipitate said copolymer and said homopolymer as a solids precipitate, separating said precipitate and drying said precipitate.

8. The method of claim 7 wherein said precipitate is thereafter banded on a rubber mill at a temperature of from 275° F. to 300° F.

9. The method of claim 7 wherein said partially halogenated olefin is vinylidene chloride, said completely halogenated olefin is chlorotrifluoroethylene and said tetrafluoro olefin is polytetrafluoroethylene.

10. A method for forming a seal between two sides of a groove formed by a pair of metal elements comprising heating a thermoplastic sealant composition comprised of 15 to 35 parts of a homopolymer of polytetrafluoroethylene and 100 parts of a copolymer of chlorotrifluroethylene and vinylidene fluoride, to a temperature of not substantially less than 225° F. and injecting said composition into said groove.

11. A method for adhesively joining two metal surfaces comprising applying a thin tape of a thermoplastic adhesive sealant composition comprised of 3 to 15 parts of a homopolymer of polytetrafluoroethylene and 100 parts of a copolymer of chlorotrifluoroethylene and vinylidene fluride to one of said surfaces, abutting the other of said surfaces thereagainst and heating said surfaces to fuse said composition.

References Cited in the file of this patent

UNITED STATES PATENTS

| | | |
|---|---|---|
| 2,650,185 | Larson | Aug. 25, 1953 |
| 2,679,468 | Pitman | May 25, 1954 |
| 2,789,959 | Smith | Apr. 23, 1957 |
| 2,789,960 | Smith | Apr. 23, 1957 |
| 2,820,772 | Barnhart | Jan. 21, 1958 |
| 2,914,438 | Sandt | Nov. 24, 1959 |
| 2,944,997 | Gates | July 12, 1960 |